United States Patent
Lorentz et al.

(10) Patent No.: US 10,653,145 B2
(45) Date of Patent: May 19, 2020

(54) HERBICIDAL COMPOSITIONS COMPRISING ACTIVE COMPOUNDS FROM THE GROUP OF THE HPPD INHIBITORS, SAFENERS AND TRIAZINES

(71) Applicant: Bayer CropScience Aktiengesellschaft, Monheim am Rhein (DE)

(72) Inventors: Lothar Lorentz, Waldbröl (DE); Klaus Trabold, Heidelberg (DE); Mathias Schmidt, Waldems (DE); Thiago De Oliveira, Santa Barbara do Oeste (BR)

(73) Assignee: BAYER CROPSCIENCE AKTIENGESELLSCHAFT, Monheim am Rhein (DE)

(*) Notice: Subject to any disclaimer, the term of this patent is extended or adjusted under 35 U.S.C. 154(b) by 67 days.

(21) Appl. No.: 16/082,378

(22) PCT Filed: Feb. 28, 2017

(86) PCT No.: PCT/EP2017/054591
§ 371 (c)(1),
(2) Date: Sep. 5, 2018

(87) PCT Pub. No.: WO2017/153205
PCT Pub. Date: Sep. 14, 2017

(65) Prior Publication Data
US 2019/0059382 A1    Feb. 28, 2019

(30) Foreign Application Priority Data
Mar. 7, 2016 (EP) .................................. 16158859

(51) Int. Cl.
| A01N 43/82 | (2006.01) |
| A01N 43/707 | (2006.01) |
| A01N 43/70 | (2006.01) |
| A01N 43/64 | (2006.01) |
| A01N 25/32 | (2006.01) |
| A01N 41/06 | (2006.01) |
| A01N 43/68 | (2006.01) |
| A01N 43/80 | (2006.01) |

(52) U.S. Cl.
CPC ............ *A01N 43/82* (2013.01); *A01N 25/32* (2013.01); *A01N 41/06* (2013.01); *A01N 43/64* (2013.01); *A01N 43/68* (2013.01); *A01N 43/70* (2013.01); *A01N 43/707* (2013.01); *A01N 43/80* (2013.01)

(58) Field of Classification Search
None
See application file for complete search history.

(56) References Cited

U.S. PATENT DOCUMENTS

| 6,884,757 B2 | 4/2005 | Ziemer et al. |
| 6,919,299 B2 | 7/2005 | Hacker et al. |
| 7,101,827 B2 | 9/2006 | Ziemer et al. |
| 7,612,017 B2 | 11/2009 | Feucht et al. |
| 7,786,041 B2 | 8/2010 | Rosinger et al. |
| 8,133,850 B2 | 3/2012 | Patel et al. |
| 8,673,814 B2 | 3/2014 | Rosinger et al. |
| 8,748,343 B2 | 6/2014 | Ziemer et al. |
| 9,101,141 B2 * | 8/2015 | Kohn ............... A01N 43/82 |
| 9,968,090 B2 | 5/2018 | Köhn et al. |
| 9,974,306 B2 | 5/2018 | Gatzweiler et al. |
| 10,111,435 B2 * | 10/2018 | Koehn ............... A01N 47/38 |
| 2003/0078167 A1 | 4/2003 | Ziemer et al. |
| 2003/0158040 A1 | 8/2003 | Hacker et al. |
| 2004/0224848 A1 | 11/2004 | Ziemer et al. |
| 2004/0224849 A1 | 11/2004 | Ziemer et al. |
| 2005/0143261 A1 | 6/2005 | Feucht et al. |
| 2005/0221984 A1 | 10/2005 | Hacker et al. |
| 2007/0010398 A1 | 1/2007 | Rosinger et al. |
| 2007/0010399 A1 | 1/2007 | Rosinger et al. |
| 2008/0318786 A1 | 12/2008 | Rosinger et al. |
| 2010/0144527 A1 | 6/2010 | Patel et al. |
| 2010/0285961 A1 | 11/2010 | Hacker et al. |
| 2011/0053773 A1 | 3/2011 | Armel et al. |
| 2012/0058894 A1 | 3/2012 | Rosinger et al. |
| 2014/0080705 A1 | 3/2014 | Köhn et al. |
| 2016/0235067 A1 | 8/2016 | Köhn et al. |
| 2016/0242419 A1 | 8/2016 | Köhn et al. |
| 2018/0213785 A1 | 8/2018 | Gatzweiler et al. |

FOREIGN PATENT DOCUMENTS

| DE | 102006030326 A1 | 1/2008 |
| DE | 102007028019 A1 | 12/2008 |
| EP | 2193712 A1 | 6/2010 |
| EP | 2832223 A1 | 2/2015 |
| WO | 2000/30447 A1 | 6/2000 |
| WO | 2002/085120 A2 | 10/2002 |
| WO | 2003/047340 A2 | 6/2003 |
| WO | 2003/079789 A1 | 10/2003 |

(Continued)

OTHER PUBLICATIONS

PCT International Search Report for PCT/EP2017/054591, dated Mar. 31, 2017.
Zhang, et al., "Herbicidal composition containing tembotrione, atrazine and isoxadifen-ethyl for corn," Abstract, XP002757390.
Soltani, et al., "Effect of Foramsulfuron and Isoxaflutole Residues on Rotational Vegetable Crops," HortScience, (2005), vol. 40, No. 3: 620-622.
Badea, et al., "Assessing the Ecologic and Economic Impacts of GM Maize Potential Cultivation in Romania," Proc. Rom. Acad. Series B, (2013), vol. 15, No. 2: 133-142.
An, et al., "Herbicide for unwanted plants, contains sulcotrione and at least one tripyridine herbicide," XP002762438.

(Continued)

*Primary Examiner* — Alton N Pryor
(74) *Attorney, Agent, or Firm* — McBee Moore & Vanik IP, LLC

(57) ABSTRACT

Herbicidal compositions comprising active compounds from the group of the HPPD inhibitors, safeners and triazines are described. These herbicidal compositions are particularly suitable for use against harmful plants in crops of useful plants.

12 Claims, No Drawings

(56) References Cited

FOREIGN PATENT DOCUMENTS

| WO | 2007/006415 A2 | 1/2007 |
| WO | 2007/006416 A2 | 1/2007 |
| WO | 2009/064702 A2 | 5/2009 |
| WO | 2012/126932 A1 | 9/2012 |
| WO | 2013/138274 A1 | 9/2013 |
| WO | 2014/072250 A1 | 5/2014 |
| WO | 2015/049225 A1 | 4/2015 |
| WO | 2015/059187 A1 | 4/2015 |

OTHER PUBLICATIONS

Wang, "Herbicide used for cornfield, comprises tembotrione, terbuthylazine or nicosulfuron, additives and filler, where filler is additive is emulsifier mixture of clay and bentonite," XP002762439.

* cited by examiner

HERBICIDAL COMPOSITIONS COMPRISING ACTIVE COMPOUNDS FROM THE GROUP OF THE HPPD INHIBITORS, SAFENERS AND TRIAZINES

CROSS-REFERENCE TO RELATED APPLICATIONS

This application is a National Stage entry of International Application No. PCT/EP2017/054591, filed Feb. 28, 2017, which claims priority to European Patent Application No. 16158859.5, filed Mar. 7, 2016.

BACKGROUND

Field

The present invention relates to agrochemically active herbicidal compositions and to the use thereof for control of harmful plants.

Specifically, it relates to agrochemically active herbicidal compositions comprising compounds from the group of the inhibitors of hydroxyphenylpyruvate dioxygenase (HPPD), triazines and safeners. These herbicidal compositions are particularly suitable for controlling unwanted harmful plants in corn and sugar cane crops.

Description of Related Art

Some herbicidal compositions comprising compounds from the group of the HPPD inhibitors, triazines and safeners are already known from the prior art. WO 2007/006415 A1 describes herbicidal compositions comprising the HPPD inhibitor tembotrione, atrazine/terbuthylazine and isoxadifen-ethyl. WO 2007/006415 A1 also discloses that these compositions have higher synergistic herbicidal activity than the herbicidal composition comprising tembotrione and atrazine/terbuthylazine. However, the compatibility of these herbicidal compositions with respect to the crop plants corn and in particular sugar cane is, in spite of the presence of the safener isoxadifen-ethyl, not always sufficient.

SUMMARY

It is an object of the present invention to provide herbicidal compositions which, having sufficient herbicidal activity, also have good compatibility with the crop plants corn and sugar cane.

It has now been found that herbicidal compositions comprising certain compounds from the group of the HPPD inhibitors, safeners and triazines and having sufficient herbicidal activity, also have good compatibility with the crop plants corn and sugar cane.

Accordingly, the present invention provides herbicidal compositions comprising

A) a compound from the group consisting of
  (A5) compound of the formula A5

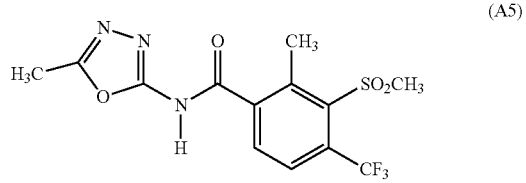 [SMILES: Cc1nnc(NC(=O)c2ccc(C(F)(F)F)c(S(C)(=O)=O)c2C)o1]

and
(A6) compound of the formula A6

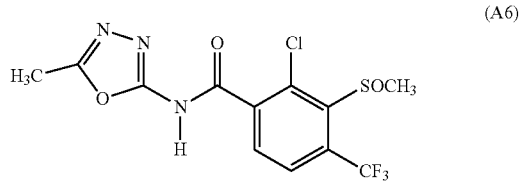

or in each case their salts
(component A),
B) a compound from the group consisting of
  (B1) isoxadifen-ethyl and
  (B2) cyprosulfamide
(component B) and
C) a compound from the group consisting of
  (C1) atrazine,
  (C2) hexazinone and
  (C4) metribuzin
(component C).

DETAILED DESCRIPTION OF A PREFERRED EMBODIMENT

The compounds of the formulae (A5) and (A6) are known as herbicides, for example from WO 2012/126932 A1. The compounds isoxadifen-ethyl and cyprosulfamide are known as safeners from "The Pesticide Manual", 16th edition, The British Crop Protection Council and the Royal Soc. of Chemistry, 2012. The compounds atrazine, hexazinone and metribuzine are known as herbicides from "The Pesticide Manual", 16th edition, The British Crop Protection Council and the Royal Soc. of Chemistry, 2012.

Of particular interest are herbicidal compositions comprising the components:
(A5)+(B1)+(C1), (A5)+(B1)+(C2), (A5)+(B1)+(C4),
(A5)+(B2)+(C1), (A5)+(B2)+(C2), (A5)+(B2)+(C4),
(A6)+(B1)+(C1), (A6)+(B1)+(C2), (A6)+(B1)+(C4),
(A6)+(B2)+(C1), (A6)+(B2)+(C2) and (A6)+(B2)+(C4).

Particularly preferred are herbicidal compositions comprising the components (A5)+(B1)+(C4) and (A5)+(B2)+(C4), and also herbicidal compositions comprising the components (A6)+(B1)+(C4) and (A6)+(B2)+(C4).

The herbicidal compositions according to the invention may comprise or be used together with additional further components, for example other kinds of active crop protection compounds and/or additives and/or formulation auxiliaries customary in crop protection.

The herbicidal compositions according to the invention not only have sufficient herbicidal activity against a large number of harmful plants typically encountered in corn and sugar cane plantations, but, surprisingly, also a markedly lower phytotoxicity toward the crop plants than the respective herbicidal composition comprising HPPD inhibitor and safener. This is surprising since there are no indications in the prior art that herbicides from the group of the triazines contribute to a reduction of the phytotoxicity toward the crop plants.

Accordingly, the present invention also provides the use of atrazine, hexazinone, metamitrone, metribuzine, simazine and terbuthlyazine for reducing the phytotoxicity in useful plants, in particular corn and sugar cane, caused by the use of herbicidal compositions comprising a compound from the group consisting of isoxaflutole, pyrasulfotole, sulcotrione, tembotrione, compound of the formula A5, compound of the formula A6 and optionally a safener from the group consisting of isoxadifen-ethyl and cyprosulfamide.

The herbicidal compositions according to the invention can be applied in a manner known to the person skilled in the art, for example together (for example as a co-formulation or as a tank-mix) or else at different times in short succession (splitting), for example to the plants, plant parts, plant seeds or the area on which the plants grow. It is possible, for example, to apply the individual active compounds or the herbicidal compositions in a plurality of portions (sequential application), for example by pre-emergence applications followed by post-emergence applications or by early post-emergence applications followed by medium or late post-emergence applications. Preference is given here to the joint application or the application within a narrow time frame of components A, B and C. Preference is also given to the application of component B by the seed dressing method and to the joint application or the application within a narrow time frame of components A and C.

In the herbicidal compositions according to the invention, the application rate of component A is usually 5 to 200 g of active ingredient (a.i.) per hectare, preferably 10 to 150 g of a.i./ha, more preferably 15 to 80 g of a.i./ha. The application rate of component B is usually 30 to 500 g of active ingredient per hectare, preferably 50 to 300 g of a.i./ha. The application rate of component C is usually 50 to 5000 g of active ingredient per hectare, preferably 75 to 2000 g of a.i./ha.

The weight ratios of components A to B on the one hand and (A+B) to C on the other hand may be varied within wide ranges. Usually, the ratio of components A to B is in the range from 1:100 to 6.7:1, preferably in the range from 1:30 to 3:1. Usually, the ratio of components (A+B) to C is in the range from 1:143 to 140:1, preferably in the range from 1:33.3 to 6:1. The ranges mentioned above also apply in the case where the herbicidal compositions according to the invention comprise more than one component B and/or component C. In this case, the numbers mentioned apply to the sums of the individual values of components B and/or C.

Optimum weight ratios may depend on the respective area of application, on the weed spectrum and on the active compound combination employed, and can be determined in preliminary tests.

On application of the herbicidal compositions according to the invention, a very broad spectrum of harmful plants is controlled pre-emergence and post-emergence, for example annual and perennial mono- or dicotyledonous weeds and unwanted crop plants. The herbicidal compositions according to the invention are particularly suitable for use in crops such as corn and sugar cane, and also for use in perennial crops, plantations and on non-crop land. Their use in crops of corn and sugar cane is preferred. They are also highly suitable for use in transgenic crops of corn.

Accordingly the present invention further provides a method of controlling unwanted plants in plant crops, which is characterized in that components A, B and C of the herbicidal compositions accordingly the invention are applied, for example separately or together, onto the plants (for example harmful plants such as mono- or dicotyledonous weeds or unwanted crop plants) or the area on which the plants grow.

Unwanted plants are understood to mean all plants which grow at sites where they are unwanted. These can be, for example, harmful plants (e.g. mono- or dicotyledonous weeds or unwanted crop plants).

Monocotyledonous weeds are classified, for example in the genera *Echinochloa, Setaria, Panicum, Digitaria, Phleum, Poa, Festuca, Eleusine, Brachiaria, Lolium, Bromus, Avena, Cyperus, Sorghum, Agropyron, Cynodon, Monochoria, Fimbristylis, Sagittaria, Eleocharis, Scirpus, Paspalum, Ischaemum, Sphenoclea, Dactyloctenium, Agrostis, Alopecurus, Apera*. Dicotyledonous weeds are classified, for example, in the genera *Sinapis, Lepidium, Galium, Stellaria, Matricaria, Anthemis, Galinsoga, Chenopodium, Urtica, Senecio, Amaranthus, Portulaca, Xanthium, Convolvulus, Ipomoea, Polygonum, Sesbania, Ambrosia, Cirsium, Carduus, Sonchus, Solanum, Rorippa, Rotala, Lindernia, Lamium, Veronica, Abutilon, Emex, Datura, Viola, Galeopsis, Papaver, Centaurea, Trifolium, Ranunculus, Taraxacum, Euphorbia*.

The invention also provides for the use of the herbicidal compositions according to the invention for controlling unwanted vegetation, preferably in crops of useful plants, in particular corn and sugar cane. Very particular preference is given to the use in sugar cane.

The herbicidal compositions according to the invention can be prepared by known methods, for example as mixed formulations of the individual components, optionally with further active compounds, additives and/or customary formulation auxiliaries, and these are then applied in a customary manner after dilution with water, or are produced as tank mixes by joint dilution of the separately formulated individual components with water. Likewise possible is the application at different times (split application) of the separately formulated or partly separately formulated individual components. It is also possible to apply the individual components or the herbicidal compositions in a plurality of portions (sequential application), for example by pre-emergence applications followed by post-emergence applications or by early post-emergence applications followed by medium or late post-emergence applications. Preference is given to the joint or immediately successive application of the active compounds in the respective combination.

The herbicidal compositions according to the invention can also be used for control of harmful plants in crops of known genetically modified plants.

In general, the transgenic plants are characterized by particular advantageous properties, for example by resistances to certain pesticides, in particular certain herbicides, resistances to plant diseases or pathogens of plant diseases, such as certain insects or microorganisms such as fungi, bacteria or viruses. Other particular properties relate, for example, to the harvested material with regard to quantity, quality, storability, composition and specific constituents. For instance, there are known transgenic plants with an elevated starch content or altered starch quality, or those with a different fatty acid composition in the harvested material. Other particular properties may be tolerance or resistance to abiotic stressors, for example heat, low temperatures, drought, salinity and ultraviolet radiation.

Conventional ways of producing novel plants which have modified properties in comparison to existing plants consist, for example, in traditional cultivation methods and the generation of mutants. Alternatively, novel plants with modified properties can be generated with the aid of recombinant methods (see, for example, EP-A-0221044, EP-A-0131624). For example, there have been descriptions in several cases of:

genetic modifications of crop plants for the purpose of modifying the starch synthesized in the plants (for example WO 92/11376, WO 92/14827, WO 91/19806), transgenic crop plants which are resistant to particular herbicides of the glufosinate type (cf., for example, EP-A-0242236, EP-A-242246) or glyphosate type (WO 92/00377) or of the sulfonylurea type (EP-A-0257993, U.S. Pat. No. 5,013,659), transgenic crop plants, for example cotton, which is capable of producing Bacillus thuringiensis toxins (Bt toxins), which make the plants resistant to certain pests (EP-A-0142924, EP-A-0193259), transgenic crop plants having a modified fatty acid composition (WO 91/13972).

genetically modified crop plants with novel constituents or secondary metabolites, for example novel phytoalexins, which bring about an increased disease resistance (EPA 309862, EPA0464461), genetically modified plants having reduced photorespiration, which have higher yields and higher stress tolerance (EPA 0305398), transgenic crop plants which produce pharmaceutically or diagnostically important proteins ("molecular pharming"), transgenic crop plants which feature higher yields or better quality, transgenic crop plants which feature a combination, for example, of the abovementioned novel properties ("gene stacking").

Numerous molecular biology techniques which can be used to produce novel transgenic plants with modified properties are known in principle; see, for example, I. Potrykus and G. Spangenberg (eds.) Gene Transfer to Plants, Springer Lab Manual (1995), Springer Verlag Berlin, Heidelberg, or Christou, "Trends in Plant Science" 1 (1996) 423-431).

For such recombinant manipulations, nucleic acid molecules which allow mutagenesis or sequence alteration by recombination of DNA sequences can be introduced into plasmids. With the aid of standard methods, it is possible, for example, to undertake base exchanges, remove parts of sequences or add natural or synthetic sequences. To join the DNA fragments with one another, adapters or linkers can be placed onto the fragments, see e.g. Sambrook et al., 1989, Molecular Cloning, A Laboratory Manual, 2nd ed. Cold Spring Harbor Laboratory Press, Cold Spring Harbor, N.Y.; or Winnacker "Gene and Klone" [Genes and Clones], VCH Weinheim 2nd edition 1996.

For example, the generation of plant cells with a reduced activity of a gene product can be achieved by expressing at least one corresponding antisense RNA, a sense RNA for achieving a cosuppression effect, or by expressing at least one suitably constructed ribozyme which specifically cleaves transcripts of the abovementioned gene product.

To this end, it is firstly possible to use DNA molecules which encompass the entire coding sequence of a gene product inclusive of any flanking sequences which may be present, and also DNA molecules which only encompass portions of the coding sequence, in which case it is necessary for these portions to be long enough to have an antisense effect in the cells. It is also possible to use DNA sequences which have a high degree of homology to the coding sequences of a gene product, but are not completely identical to them.

When expressing nucleic acid molecules in plants, the protein synthesized may be localized in any desired compartment of the plant cell. However, to achieve localization in a particular compartment, it is possible, for example, to join the coding region to DNA sequences which ensure localization in a particular compartment. Such sequences are known to those skilled in the art (see, for example, Braun et al., EMBO J. 11 (1992), 3219-3227; Wolter et al., Proc. Natl. Acad. Sci. USA 85 (1988), 846-850; Sonnewald et al., Plant J. 1 (1991), 95-106). The nucleic acid molecules can also be expressed in the organelles of the plant cells.

The transgenic plant cells can be regenerated by known techniques to give rise to entire plants. In principle, the transgenic plants may be plants of any desired plant species, i.e. not only monocotyledonous but also dicotyledonous plants.

Thus, transgenic plants can be obtained whose properties are altered by overexpression, suppression or inhibition of homologous (=natural) genes or gene sequences or expression of heterologous (=foreign) genes or gene sequences.

Preferably the compositions according to the invention can be used in transgenic crops which are resistant to growth regulators such as, for example, dicamba, or to herbicides which inhibit essential plant enzymes, for example acetolactate synthases (ALS), EPSP synthases, glutamine synthases (GS) or hydroxyphenylpyruvate dioxygenases (HPPD), or to herbicides from the group of the sulfonylureas, the glyphosates, glufosinates or benzoylisoxazoles and analogous active compounds.

When the compositions according to the invention are employed in transgenic crops, not only do the effects toward harmful plants observed in other crops occur, but frequently also effects which are specific to application in the particular transgenic crop, for example an altered or specifically widened spectrum of weeds which can be controlled, altered application rates which can be used for the application, preferably good combinability with the herbicides to which the transgenic crop is resistant, and influencing of growth and yield of the transgenic crop plants. The invention therefore also provides for the use of the compositions according to the invention for control of harmful plants in transgenic crop plants.

Preference is given to the use of the compositions according to the invention in economically important transgenic crops of corn and sugar cane. The invention therefore also provides for the use of the compositions according to the invention for control of harmful plants in transgenic crop plants or crop plants having tolerance through selective breeding.

The components A, B and C can be converted together or separately to customary formulations, for example for application by atomizing, watering and spraying, such as solutions, emulsions, suspensions, powders, foams, pastes, granules, aerosols, active compound-impregnated natural and synthetic substances, microencapsulations in polymeric substances. The formulations may comprise the customary auxiliaries and additives.

These formulations are produced in a known manner, for example by mixing the components A, B and C with extenders, i.e. liquid solvents, pressurized liquefied gases and/or solid carriers, optionally with use of surfactants, i.e. emulsifiers and/or dispersants and/or foam formers.

If the extender used is water, it is also possible to use, for example, organic solvents as auxiliary solvents. Essentially, suitable liquid solvents are: aromatics such as xylene, toluene or alkylnaphthalenes, chlorinated aromatics or chlorinated aliphatic hydrocarbons such as chlorobenzenes, chloroethylenes or methylene chloride, aliphatic hydrocarbons such as cyclohexane or paraffins, for example mineral oil fractions, mineral and vegetable oils, alcohols such as butanol or glycol and the ethers and esters thereof, ketones such as acetone, methyl ethyl ketone, methyl isobutyl ketone or cyclohexanone, strongly polar solvents such as dimethylformamide or dimethyl sulfoxide, and water.

Useful solid carriers include: for example ammonium salts and ground natural minerals, such as kaolins, clays, talc, chalk, quartz, attapulgite, montmorillonite or diatomaceous earth, and ground synthetic minerals, such as finely divided silica, alumina and silicates; useful solid carriers for granules include: for example crushed and fractionated natural rocks, such as calcite, marble, pumice, sepiolite, dolomite and synthetic granules of inorganic and organic flours, and granules of organic material, such as sawdust, coconut shells, corn cobs and tobacco stalks; useful emulsifiers and/or foam formers include: for example nonionic and anionic emulsifiers, such as polyoxyethylene fatty acid esters, polyoxyethylene fatty alcohol ethers, e.g. alkylaryl polyglycol ethers, alkylsulfonates, alkylsulfates, arylsulfonates and protein hydrolyzates; useful dispersants include: for example lignosulfite waste liquors and methylcellulose.

Tackifiers, such as carboxymethyl cellulose, natural and synthetic polymers in the form of powders, granules or latices, such as gum arabic, polyvinyl alcohol and polyvinyl acetate, and also natural phospholipids, such as cephalins and lecithins, and synthetic phospholipids can be used in the formulations. Further additives may be mineral and vegetable oils.

It is possible to use colorants such as inorganic pigments, for example iron oxide, titanium oxide and Prussian blue, and organic colorants such as alizarin colorants, azo colorants and metal phthalocyanine colorants, and trace nutrients such as salts of iron, manganese, boron, copper, cobalt, molybdenum and zinc.

In general, the formulations comprise between 0.1 and 95 percent by weight of the components A, B and C, preferably between 0.5 and 90% by weight. As such or in their formulations, the components A, B and C can also be used as a mixture with other active agrochemical compounds for controlling unwanted vegetation, for example for controlling weeds or for controlling unwanted crop plants, finished formulations or tank mixes, for example, being possible.

Also possible are mixtures with other known active compounds such as fungicides, insecticides, acaricides, nematicides, bird antifeedants, plant nutrients and soil improvers, and likewise with additives and formulation auxiliaries customary in crop protection.

The components A, B and C can be used as such, in the form of their formulations or in the use forms prepared therefrom by further dilution, such as ready-to-use solutions, suspensions, emulsions, powders, pastes and granules. Application is typically accomplished, for example, by watering, sprinkling, spraying, broadcasting.

The components A, B and C can be applied to the plants, plant parts or area under cultivation (soil), preferably on the green plants and plant parts, and to the soil. One possible use is the joint application of the active compounds in the form of tank mixes, where the formulated concentrated formulations of the individual active compounds are, together, mixed in a tank with water, and the spray liquor obtained is applied.

For application, the formulations in commercial form are, if appropriate, diluted in a customary manner, for example in the case of wettable powders, emulsifiable concentrates, dispersions and water-dispersible granules with water. Dust-type preparations, granules for soil application or granules for scattering and sprayable solutions are not normally diluted further with other inert substances prior to application.

WORKING EXAMPLES

Post-Emergence Herbicidal Activity Against Harmful Plants and Phytotoxicity Toward Useful Plants:

Sugar cane having a height of 25 to 30 cm and harmful plants are treated with herbicidal compositions according to the invention comprising components A, B and C. For comparative purposes, the same tests are carried out with herbicidal compositions comprising only components A and B, and also with herbicidal compositions comprising only component A. The herbicidal activity and phytotoxicity of the compositions according to the invention are shown in a comparative manner in the tables below.

The abbreviations mean:
BIDPI *Bidens pilosa*
EPHHL *Euphorbia heterophylla*
IPOAO *Ipomoea aristolochiaefolia*

TABLE 1

| | Herbicidal composition | Dosage [g/ha] | Herbicidal activity [%] against | | |
|---|---|---|---|---|---|
| | | | IPOAO | EPHHL | BIDPI |
| 1 | A5 | 50 | 38% | 30% | 42% |
| 2 | A5 + B1 | 50 + 150 | 37% | 28% | 38% |
| 3 | A5 + B1 + C4 | 50 + 150 + 480 | 77% | 50% | 85% |

TABLE 2

| | Herbicidal composition | Dosage [g/ha] | Herbicidal activity [%] against *Saccharum officinarum* (sugar cane) |
|---|---|---|---|
| 1 | A5 | 50 | 14% |
| 2 | A5 + B1 | 50 + 150 | 6% |
| 3 | A5 + C4 | 50 + 480 | 8% |
| 4 | A5 + B1 + C4 | 50 + 150 + 480 | 4% |

The results in Table 1 show that the mixture (row 2) of herbicide A5 with safener B1, within the margin of error of the assessment, has the same herbicidal activity against harmful plants as herbicide A5 alone (row 1). The mixture (row 3) of herbicide A5 with safener B1 and herbicide C4 shows a markedly enhanced herbicidal activity against harmful plants.

Surprisingly, the data in Table 2 show that the mixture (row 4) of herbicide A5 with safener B1 and herbicide C4 causes markedly less damage to the crop plant sugar cane than the mixture (row 2) of herbicide A5 with safener B1.

The invention claimed is:
1. A herbicidal composition comprising
A) a compound from the group consisting of
(A5) compound of formula A5

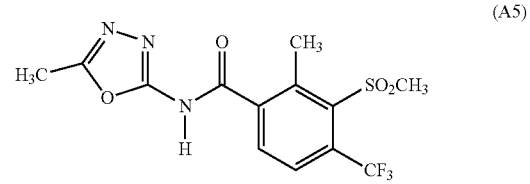 [SMILES: Cc1nnc(NC(=O)c2ccc(C(F)(F)F)c(S(C)(=O)=O)c2C)o1]

and
(A6) compound of formula A6

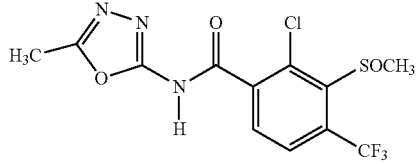

(A6)

or in each case their salts
(component A),
B) a compound from the group consisting of
(B1) isoxadifen-ethyl and
(B2) cyprosulfamide
(component B) and
C) a compound from the group consisting of
(C1) atrazine,
(C2) hexazinone and
(C4) metribuzin
(component C);
wherein the addition of the component C to the component A plus component B enhances the herbicidal activity of the A plus B as well as reduces the damage caused by the component A plus component B to a crop plant.

2. The herbicidal composition as claimed in claim 1, comprising
A) (A5) the compound of formula A5

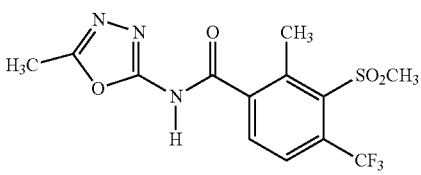

(A5)

or salts thereof
(component A),
B) a compound from the group consisting of
(B1) isoxadifen-ethyl and
(B2) cyprosulfamide
(component B)
and
C) (C4) metribuzin,
(component C).

3. The herbicidal composition as claimed in claim 1, comprising

A) (A6) the compound of formula A6

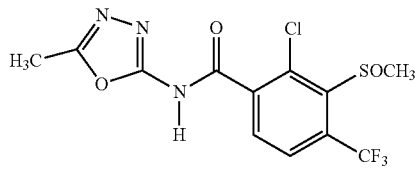

(A6)

or salts thereof
(component A),
B) a compound from the group consisting of
(B1) isoxadifen-ethyl and
(B2) cyprosulfamide
(component B)
and
C) (C4) metribuzin,
(component C).

4. The herbicidal composition as claimed in claim 1 in a mixture with one or more formulation auxiliaries.

5. The herbicidal composition as claimed in claim 1, comprising at least one further pesticidally active substance selected from the group consisting of insecticides, acaricides, herbicides, fungicides, safeners, and growth regulators.

6. The herbicidal composition as claimed in claim 1, comprising the components A and B in a ratio of from 1:100 to 6.7:1 and the components (A+B) and C in a ratio of from 1:143 to 140:1.

7. The herbicidal composition as claimed in claim 1, comprising the components A and B in a ratio of from 1:30 to 3:1 and the components (A+B) and C in a ratio of from 1:33.3 to 6:1.

8. A product comprising the herbicidal composition according to claim 1 for reducing the phytotoxicity in one or more useful plants.

9. A method for controlling one or more unwanted plants, comprising applying a herbicidal composition as claimed in claim 1 to the plants or to a site of unwanted vegetation.

10. The method as claimed in claim 9, wherein control of unwanted plants takes place in one or more crops of corn or sugar cane.

11. The method according to claim 9, wherein the site of unwanted vegetation comprises useful plants, and wherein said useful plants comprise corn or sugar cane.

12. The method according to claim 9, wherein the site of unwanted vegetation comprises useful plants, and wherein said useful plants comprise sugar cane.

* * * * *